(12) United States Patent
Dineen et al.

(10) Patent No.: US 8,285,579 B2
(45) Date of Patent: Oct. 9, 2012

(54) AUTOMATIC DETERMINATION AND LOCATION OF PRODUCT SUPPORT INFRASTRUCTURE RESOURCES

(75) Inventors: Lisbeth Ann Dineen, Bridgeville, PA (US); Verlyn Mark Johnson, Wykoff, MN (US); John Edward Laskowski, Rochester, MN (US); Janet Rooney Olausen, Woodbury, MN (US); Clark Lewis Roscher, Warwick, RI (US); Christina Anne Stockey, Bramalea (CA)

(73) Assignee: International Business Machines Corporation, Armonk, NY (US)

( * ) Notice: Subject to any disclaimer, the term of this patent is extended or adjusted under 35 U.S.C. 154(b) by 1554 days.

(21) Appl. No.: 10/932,703

(22) Filed: Sep. 2, 2004

(65) Prior Publication Data

US 2006/0047550 A1  Mar. 2, 2006

(51) Int. Cl.
*G06Q 10/00* (2012.01)
(52) U.S. Cl. .............. 705/7.25; 705/7.23; 705/7.21; 705/7.22
(58) Field of Classification Search .............. None
See application file for complete search history.

(56) References Cited

U.S. PATENT DOCUMENTS

| | | | | | |
|---|---|---|---|---|---|
| 5,208,765 | A | * | 5/1993 | Turnbull | 702/84 |
| 5,999,908 | A | * | 12/1999 | Abelow | 705/1 |
| 6,049,744 | A | * | 4/2000 | Kinoshita et al. | 700/195 |
| 6,101,479 | A | * | 8/2000 | Shaw | 705/8 |
| 6,195,590 | B1 | * | 2/2001 | Powell | 700/36 |
| 6,574,605 | B1 | * | 6/2003 | Sanders et al. | 705/7.26 |
| 6,651,244 | B1 | * | 11/2003 | Smith et al. | 717/154 |
| 6,810,401 | B1 | * | 10/2004 | Thompson et al. | 707/101 |
| 6,862,585 | B2 | * | 3/2005 | Planalp et al. | 707/1 |
| 6,970,803 | B1 | * | 11/2005 | Aerdts et al. | 702/179 |
| 6,985,872 | B2 | * | 1/2006 | Benbassat et al. | 705/7.14 |
| 7,412,430 | B1 | * | 8/2008 | Moore | 706/46 |
| 2002/0035495 | A1 | * | 3/2002 | Spira et al. | 705/7 |
| 2002/0052862 | A1 | * | 5/2002 | Scott et al. | 707/1 |
| 2002/0165744 | A1 | * | 11/2002 | Juras et al. | 705/7 |
| 2003/0033184 | A1 | | 2/2003 | Benbassat et al. | |
| 2003/0033191 | A1 | * | 2/2003 | Davies et al. | 705/10 |
| 2003/0149610 | A1 | * | 8/2003 | Rowan et al. | 705/10 |
| 2004/0210473 | A1 | * | 10/2004 | Goddard | 705/10 |
| 2004/0260592 | A1 | * | 12/2004 | George et al. | 705/8 |
| 2005/0131754 | A1 | * | 6/2005 | Chapman et al. | 705/10 |

OTHER PUBLICATIONS

Kaiser, Javaid. "Identification of Factor that affect software complexity". Dec. 1985.*

(Continued)

*Primary Examiner* — Jonathan G Sterrett
*Assistant Examiner* — Tzu-Hsiang Lan
(74) *Attorney, Agent, or Firm* — Yudell Isidore Ng Russell PLLC

(57) ABSTRACT

A method and system for enabling an automatic determination and allocation of product support resources. The automated process allocates support resources based on a combination of product and market requirements and historical data on resources used by similar products in similar markets. Projects requiring a support infrastructure are algorithmically classified by a combination of product complexity metrics and target market maturity metrics. Then, support infrastructure requirements are calculated based on the combined classification along with historical usage records for similarly classified products. The classification and allocation process is automated so that a product (or multiple products competing for available resources) can self-provision/request its resource requirement as a part of the product development and go-to-market process.

14 Claims, 6 Drawing Sheets

OTHER PUBLICATIONS

Ratbe, Dina; King, William R.; Kim, Young-Gul; "The fit between project characteristics and application development methodologies: a contigency approach", Winter 1999-2000, Journal of Computer Information System, pp. 26.*

Donah Bob, "ISBM Nuggest: New product Development Consortium—Porfolio Management", Mar. 19, 2001, ISBM New Product Development Consortium, Philadelphia, PA, pp. 1-54.*

Cooper, Robert G; Kleinschmidt, Elko J; "New product performance: what distinguishes the star products", Jun. 2000, Australian Journal of Management, 25, 2, ABI/INFORM Global, p. 17.*

Novak, Sharon; Eppinger, Steven D. "Sourcing by Design: Product Complexity and Supply Chain," Jan. 2001, Management Science, pp. 189-204, www.jstor.org/stable/2661567.*

Kim, Jongbae; Wilemon, David, "Sources and assessment of complexity in NPD projects," Jan. 2003, R&D Management, Blackwell Publishing Ltd 2003, pp. 15-20.*

Kearney, Joseph K.; Sedlmeyer, Robert L. et al. "Software Complexity Measurement," Nov. 1986, vol. 29 No. 11, Communications of the ACM, pp. 1044-1050.*

Stehling, Frank; Moormann, Juergen, "Strategic Positioning of E-Commerce Business Models in the Porfolio of Corporate Banking," Oct. 2001, Hochschule fuer Bankwirtschaft, pp. 1-29.*

Boehm Barry W.; Abts, Christ et al. "Software cost estimation with COCOMO II," 2000, Prentice Hall PTR, ISBN 0-13-026692-2, pp. 1-440.*

* cited by examiner

| CLASSIFICATIONS 501 | PRODUCT A 503 COMPLEXITY SCORE | |
|---|---|---|
| 1ST RELEASE | Y | 1 |
| EXTENSIVE NEW FEATURES | Y | 1 |
|  | N | 0 |
| EXPORT COORDINATION REQUIRED | Y | 1 |
| ⋮ | | ⋮ |
| HISTORICAL SUPPORT AREA | Y | 1 |
| EXTENSIVE TRAINING/EDUCATION | N | 0 |

⌐500

Complexity Questionaire for validating the Complexity Scoring

Fig. 6

| Fig. 6A |
|---|
| Fig. 6B |

*Fig. 6A*

Product Name

Complex Questions (1 point per Yes)   Yes=Y, No=N

Weight Factor - 3

XXXXXXXXX V1.0

| Question | Answer |
|---|---|
| Is this the first release of the product? | n |
| Does this release have extensive new features? | n |
| Does this release require extensive new skills to use? | n |
| Will support be required from organizations that have (vendor, SWG, iSeries, etc.) not supported this product, or product set, in the past? | n |
| Will services or support need to be coordinated across several organizations and/or Brands (IGS, ISSW, etc)? | n |
| Will extensive new education classes, service collateral/offerings, and technical sales collateral be required? | y |
| Is it necessary to train/enable several new channel support organizations or provide extensive skills upgrades to existing channel support organization (WICS, WCCs, etc)? | n |

Complex Score                               1      0.4285714

Major Questions (1 point per Yes)       Weight Factor - 2

| Question | Complex Answer | Validation- Is this Yes and there Is another Yes? |
|---|---|---|
| XXXXXXXXX V1.0 | | |
| Is this a second release of a product? | y | n | OK |
| Does this release have significant new features? | y | n | OK |
| Does this release require significant new skills to use? | n | n | OK |
| Will this release require additional resources in the existing support organizations (vendor, SWG, iSeries, etc.)? | N | n | OK |

| Question | Complex Answer | Major Answer | Validation- Is this Yes and there Is another Yes? | Validation- All NO answers? |
|---|---|---|---|---|
| Is services or support primarily contained within one organization (IGS, ISSW, etc) or Brand, with others involved infrequently? | y | n | OK | |
| Will significant updates to existing education classes, service collateral/ offerings, and technical sales collateral be required? | y | y | #VALUE! | |
| Is it necessary to train/enable one new channel support organization or provide signficant skills upgrades to an existing channel support organization (WICS, WCCs, etc)? | y | n | OK | |
| | 5 | 1.4285714 | | |

Minor Questions (1 point per Yes)    Weight Factor - 1

XXXXXXXXX V1.0

| Question | Complex Answer | Major Answer | Validation- Is this Yes and there Is another Yes? | Validation- All NO answers? |
|---|---|---|---|---|
| Is this a third or latter release of a product? | y | n | y | #VALUE! | OK |
| Does this release have minimal new features? | N | n | y | OK | OK |
| Does this release require minimal new skills to use? | N | n | n | OK | #VALUE! |
| Can this release be supported with current resources in existing support organizations (vendor, SWG, iSeries, etc.)? | y | n | N | OK | OK |
| Is services or support contained within one organization (IGS, ISSW, etc) or Brand? | N | n | y | OK | OK |
| Will some/minimal updates to existing education classes, service collateral/ offerings, and technical sales collateral be required? | N | y | y | OK | OK |
| Is it necessary to provide minimal training and skills upgrades to existing channel support organization(s) (WICS, WCCs, etc)? | y | n | y | OK | OK |
| | 2 | | 0.2857143 | |
| | | | 2.1428571 | |

| This Product is | MAJOR |
|---|---|

*Fig. 6B*

AUTOMATIC DETERMINATION AND LOCATION OF PRODUCT SUPPORT INFRASTRUCTURE RESOURCES

BACKGROUND OF THE INVENTION

1. Technical Field

The present invention relates generally to resource allocation and specifically to a method and system for determining the correct amount of resources to allocate to products. Still more particularly, the present invention relates to a method and system for enabling autonomic determination of correct levels of product support resources to allocate to new/developing products.

2. Description of the Related Art

Consumers of new and existing products typically rely on the company creating/releasing the product to provide technical and other support for implementing and maintaining the product. As new products, or new releases of existing products, are brought to market, it is therefore necessary to ensure that adequate support infrastructure (technical and otherwise) is put in place to handle consumer needs for support of the product. This infrastructure typically includes problem reporting/resolution, technical sales support (e.g., skills, demos, etc), education, and consulting services. Because most companies produce multiple products and or multiple versions of a single product, each of these support areas typically handle requests from multiple consumers of different products. The source company thus needs to be able to predict the amount of resources that will be needed for a particular product release. When, as in most instances, there are limited support resources available, the company must further determine how to allocate the available resources across multiple products and multiple requests. This determination may require implementing a prioritization scheme for handling incoming requests concerning multiple different products (or multiple versions of the same product).

Existing approaches to this problem rely mainly on subjective assessments of the amount and type of resources that will be required to support a release. These existing approaches have not included empirical measurements that define the environment of a release, which in turn, affects the types and amount of support resources that are actually needed. Thus, the existing approaches typically results in ineffective allocation and/or utilization of resources, whereby some products do not have the amount of support needed, while other products have more support than is required.

Some development has occurred in the area of prioritizing resource allocation and in automating business processes. However, current efforts to automate business processes have not yet addressed the allocation of support resources. Current resource allocation approaches do not base allocations upon algorithmically determined product and target market requirements. For example, one approach utilizes the perceived or determined importance of the product to determine the amount of resources to allocate to support the product. This approach yields incorrect results because, while a product may be key (important) to a business strategy, the product may actually require less support resources than a new (less important) product in an emerging market, particularly if the product has been in the market for some time.

Also, existing Project Management approaches attempt to allocate resources based on optimization of key business goals. However, while the key business goal is a factor that needs to be considered, the key business goal is not sufficient by itself, as that goal fails to consider the state of the current support infrastructure (or lack of one) and what may be needed to provide adequate support.

Several online examples of currently available support analysis implementations are listed below. These include world-wide web (www) sites:

"umt.com/site/index.php?page=250," which illustrates a product that assigns resources based on contribution to a business strategy;

"solver.com/tutorial.htm," which illustrates a linear optimization tool, but provides no mechanism/model for how to assign support resources;

"computerworld.com/managementtopicslmanagement-Jstory/O,10801,69129,00.html," which discusses the value of portfolio management and prioritizing projects, and suggests that they be prioritized by business strategies; and "smeal.psu.edu/isbm/web/4thNewProdNuggets2001.pdf," which discusses the importance of selecting the right projects to work on. This method does not address allocation of support resources for those projects.

Also, there are several patents and/or patent submissions that describe other methods of allocating resources. For example:

U.S. Patent Application No. 2003/0033184 describes detailed allocations of specific resources to specific tasks and includes looking at historical data for estimates of future costs at a detailed task level. This submission does not account for market maturity, as it is not an important factor in the detailed, task level assignment being addressed;

U.S. Pat. No. 6,675,149 describes allocating information systems (IS) skills (i.e., programmers, architects) to a list of projects, where the prioritization is based on company objectives, and the requirements of each projects. The priority that results is the one that best utilizes the IS skills to best meet the company's objectives rather than actual support requirements; and U.S. Pat. No. 5,963,911 describes a way to optimize cost when assigning a set of resources to a set of jobs that need to be performed.

In addition to the above, additional development has occurred with defining new approaches and systems to perform day-to-day business processes. These systems attempt to eliminate/reduce as much of the manual efforts required by automating as much of the analysis as possible. None of the above implementations address allocation of support resources as a computation that takes into account maturity of the market being targeted, complexity of the product supported, and historical data to better estimate future resource needs and prioritizing the use of resources. Also, none of the methods provide a mechanism for automated determination and assignment of support resources.

The present invention thus recognizes that it would be desirable to have a computational process and mechanism for allocating support resources based on a combination of product and market requirements and historical data on resources used by similar products in similar markets. The invention further realizes that a process that is automated so that a product can "self-provision" or request these resource requirements as part of a development and go-to-market process would be a welcomed improvement. These and other benefits are provided by the invention described herein.

SUMMARY OF THE INVENTION

Disclosed is a method and system for enabling autonomic determination and allocation of product support resources.

The automated process allocates support resources based on a combination of product and market requirements and historical data on resources used by similar products in similar markets. Projects requiring a support infrastructure are algorithmically classified by a combination of product complexity metrics and target market maturity metrics. Then, support infrastructure requirements are calculated based on the combined classification along with historical usage records for similarly classified products. The classification and allocation process is automated so that a product (or multiple products competing for available resources) can self-provision/request its resource requirement as a part of the product development and go-to-market process.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 6A-6B illustrates user interfaces of an application utilized to enter values of the various characteristics of the product during the evaluation of resource requirements in accordance with one embodiment of the present invention.

DETAILED DESCRIPTION OF AN
ILLUSTRATIVE EMBODIMENT

The present invention provides a method and system for enabling autonomic determination and allocation of product support resources. The automated process allocates support resources based on a combination of product and market requirements and historical data on resources used by similar products in similar markets. Projects requiring a support infrastructure are algorithmically classified by a combination of product complexity metrics and target market maturity metrics. Then, support infrastructure requirements are calculated based on the combined classification along with historical usage records for similarly classified products. The classification and allocation process is automated so that a product (or multiple products competing for available resources) can self-provision/request its resource requirement as a part of the product development and go-to-market process.

The invention provides two key concepts. The first concept involves two processes: (1) algorithmically classifying projects that require a support infrastructure by a combination of product complexity and target market maturity; then, (2) calculating support infrastructure requirements based on that combined classification along with historical usage records for similarly classified products. The second concept is that of automating a substantial portion of the classification and allocation processes. Implementation of the invention results in a (set of) support resource allocation(s) returned in an autonomic format (e.g., variable/value).

Figure 1:
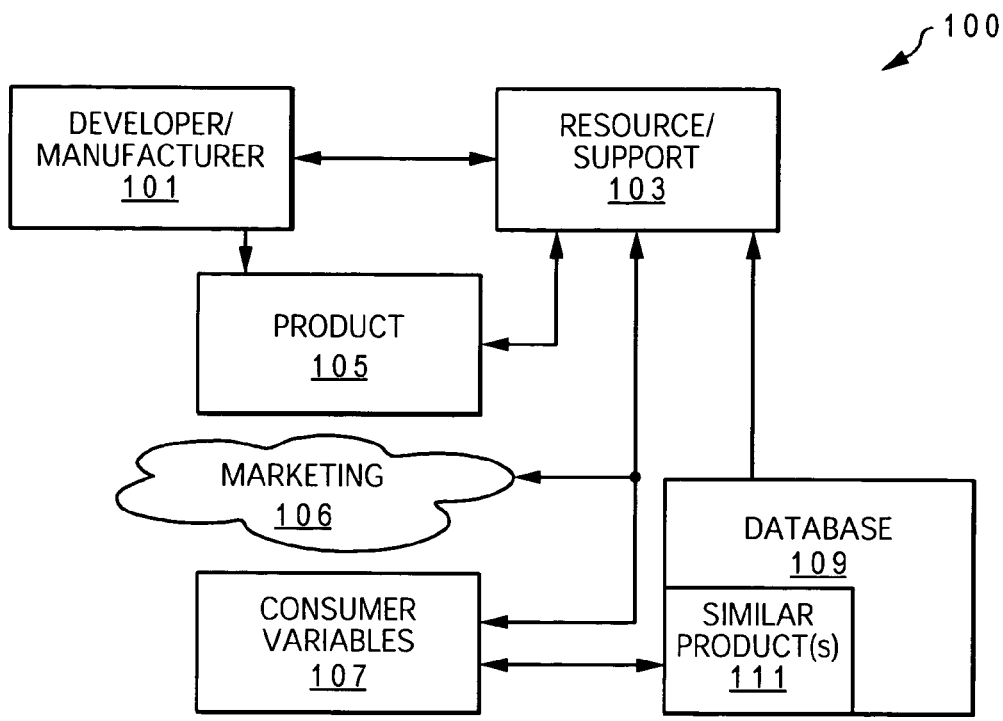
FIG. 1 is a block diagram illustrating the overall product development environment within which the calculation of resource allocation is completed during product development/release according to one implementation of the invention.

With reference now to the figures, and particularly FIG. 1, there is illustrated an overview of a product environment and the inter-connection between relevant components/ facilities involved in the data collection and support/resource calculations of the present invention. Central to the analysis is the product 105 that is developed/manufactured for release by a product developer 101 and for which a support/resource calculation system (SRCS) 103 is being established. The product 105 may be any item/device that is utilized by a consumer 107, and for which the consumer may require support in set-up, implementation, maintenance, etc., of the product 105. The product developer 101 may not actually be affiliated with the SRCS 103. Also, the product may be provided to the consumer via a Value Added Reseller (VAR), who does not provide the support resource. Also, SRCS 103 may be a division/service arm of product developer 101 or a separate independent resource group contracted to complete the product analysis and resource calculations, and provide the support resources to the consumer 107.

Arrows within FIG. 1 illustrate the directional flow of information concerning the product and other data required in the calculation by the SRCS 103. For example, actual product information (e.g., product complexity) is provided to the SRCS 103 by the product developer and by internal testing/ evaluation of the product. Marketing factors 106 and consumer variables (inquiries, request for support, responses/ comments/ratings, use factors, etc.) are also provided to the SRCS 103. Notably, the SRCS 103 also communicates with the consumer to either request information or provide resources (to the consumer) when requested. Finally, historical data is received by the SRCS 103 from a database 109, which maintains historical data 111 of similar products. The SCRS 103 determines an amount of marketing that is required for the product's support services and generates a marketing output (i.e., marketing component 106). The marketing component 106 also factors into the calculations of required product support, since the amount of marketing determines whether the consumer is aware of the availability of support resources and should correlate to the level of use of these resources by the consumer.

According to one embodiment, the SRCS 103 includes support personnel as well as a computer system and/or other equipment required for interfacing with the other parts of the overall product environment. The computer equipment includes a data processing system that enables the automation of several of the data collection, resource evaluation, and other features to determine a best allocation of support resources/services.

Figure 2:
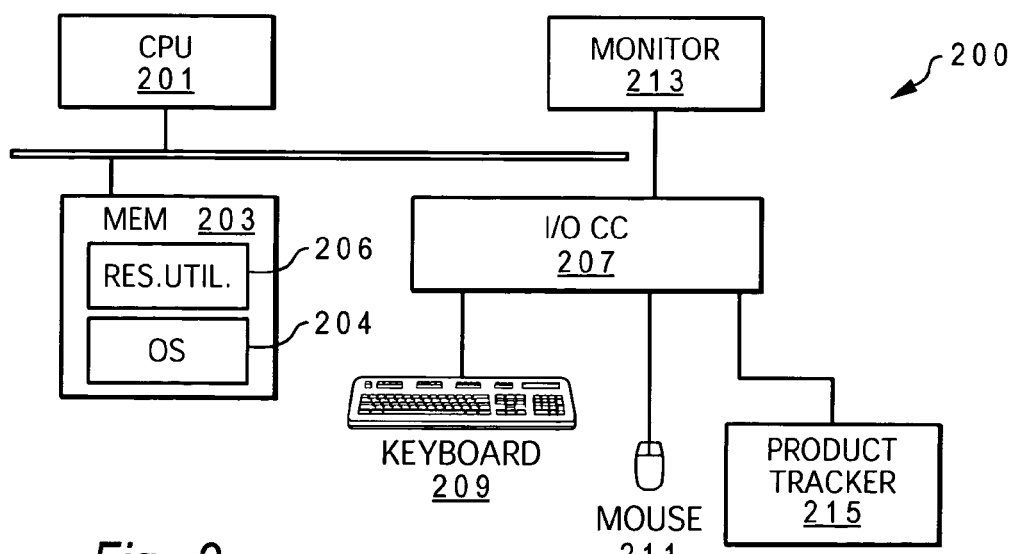
FIG. 2 is a block diagram of component parts of a computer system that may be utilized to complete the automated calculations for resource allocations according to one implementation of the invention.

Turning now to FIG. 2, there is illustrated an example data processing system (DPS) 200 that may be utilized to complete several of the automated processes of the invention. DPS 200 includes a central processing unit (CPU) 201 which is connected to memory 203 and input/output (I/O) channel controller (CC) via Interconnect 205. Within memory are software components, including operating system (OS) 204 and resource allocation utility 206. Resource allocation utility (RAU) 206 includes the software code that, when executed on CPU 201, provides the various autonomic functionality of the invention as described below.

Figures 5A, 5B:
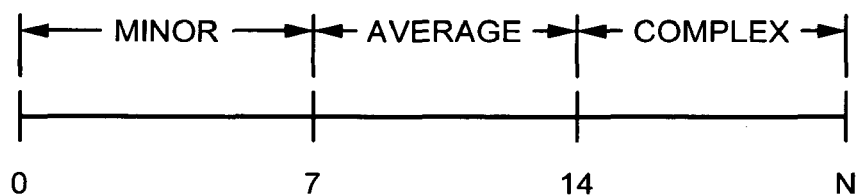
FIG. 5A is a block diagram representation of exemplary classifications and values evaluated during analysis/determination of the relative scores for each major factor associated with the product according to one implementation of the invention.
FIG. 5B is a scale indicating clip levels for product analysis according to one embodiment of the invention.

I/O CC 207 operates as a controller for output device, such as monitor 213, and various input devices, such as keyboard 209 and mouse 211. These devices are utilized to enable user-input of required data or parameters as well as user interaction with the functional (interface) features of RAU 206. In one implementation, RAU 206 provides a graphical user interface (GUI) displayed on monitor 213. GUI may depict an application for inputting classification data used in the complexity calculations, as shown by FIG. 5A.

In addition to the aforementioned input devices, the present invention provides another input mechanism, referred to as product tracker 215, that completes one or more of the following functions: (1) receive status message from the product via a network link (such as the Internet); (2) receives consumer reporting on product status; (3) monitor electronic submissions of consumer request for support; etc. The specific processes of the invention are illustrated by the following flow charts, beginning with FIGS. 3A-3B.

Figure 3A:
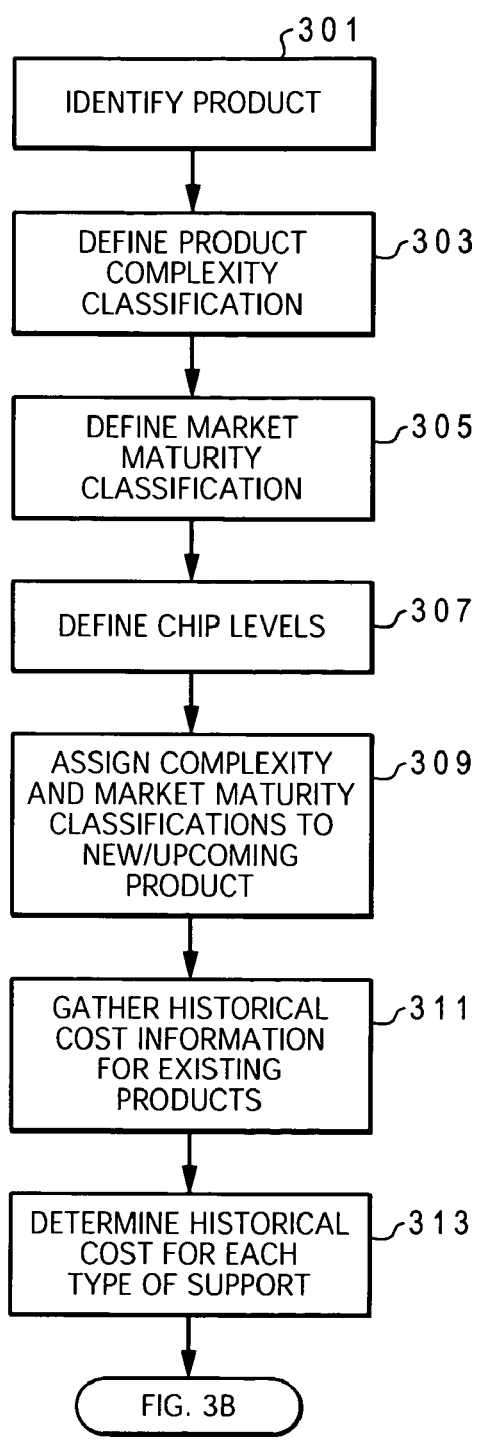
FIGS. 3A-3B is a flow chart of the process of completing the calculation of required support resource allocation and completing the definitions and calculations of costs associated with support resource allocation according to one implementation of the invention.
Figure 3B:
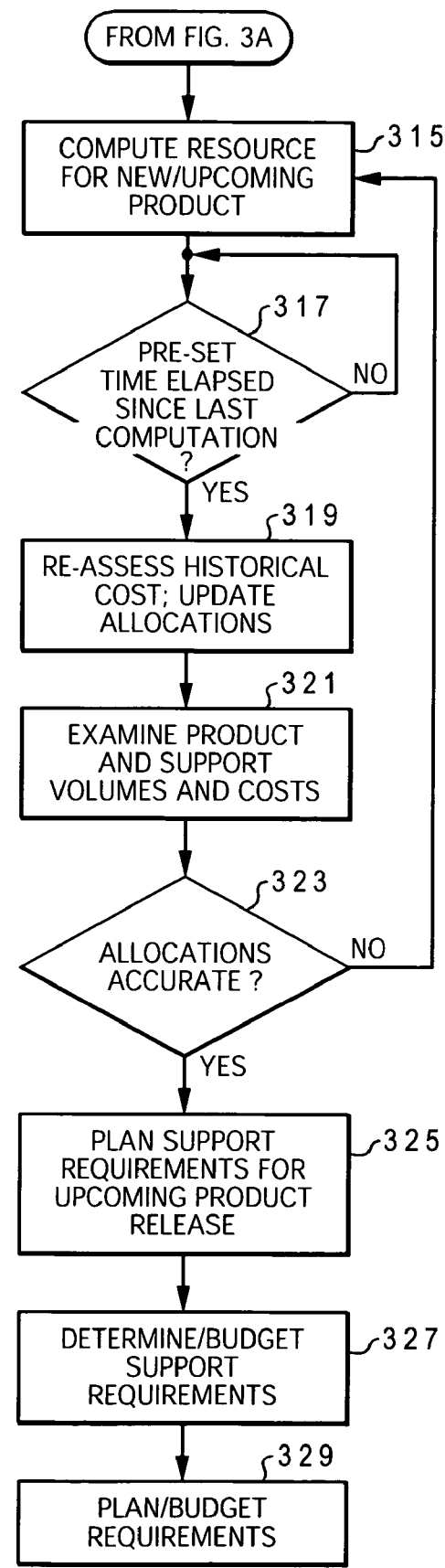

FIGS. 3A-3B illustrates the process for determining an amount of infrastructure resource to allocate to a new or upcoming product. The process is completed by the resource group (SRCS 105 of FIG. 1) during the actual development of and/or prior to the release of the product(s). The process begins at step 301 at which a product that will require (post-release) support resources is identified (i.e., certain characteristics of the product made know to the personnel managing the evaluation process). Each product has different characteristics and thus requires a different amount/level of support based on its unique evaluation. Thus, identification of the product is crucial to determining the correct historical data to access, the answers given to pertinent questions when calculating the clip levels, and ultimately the amount and/or level of support required. The evaluation is completed independent of whether the calculations are completed manually or via an automated system. Implementation of the invention, however, does not assume that the product being evaluated actually requires support resources. Even those products that will require very little or no support may be analyzed in order to reach a more current and accurate conclusion about whether support is required.

Figure 4A:
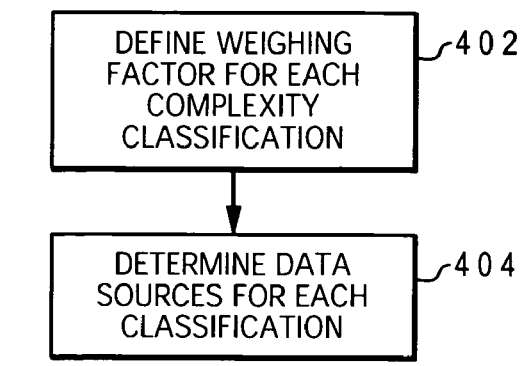
FIG. 4A illustrates the two processes involved in determining weighting factors and data sources for each classification according to one embodiment of the invention.

Once the product is identified, the product's complexity classification is defined at step 303. Then, the market maturity classification of the product is defined at step 305. Notably, both of these steps also entail defining the characteristics that will be used to assess each classification, which involves the two steps that are illustrated by the flow chart of FIG. 4A. These processes include first defining a weighting factor for each complexity classification (as indicated at step 402) and then determining data sources to be evaluated for each classification, as shown at step 404. These definitions may be provided via entry into the GUI (e.g., FIGS. 5A, 6A-6B) of the RAU.

As shown by GUI 500 of FIG. 5A, each characteristic 501 is assigned a true/false value 503 that indicates either true or false for a classification. For purposes of the invention, each characteristic that is "true" is assigned a value of 1 and those that are "false" are assigned a value of 0. Entry or selection of the true/false value 503 occurs via the GUI provided by the RAU.

Returning to FIG. 3A, once the product complexity level and market maturity levels have been defined, the clip levels for both product complexity and market maturity are defined at step 307. The clip levels are relative cut-off points along a scale utilized to illustrate relative rating of a product against a normalized set of graded characteristics. An exemplary scale is illustrated by FIG. 5B with three clip levels.

For simplicity of the invention, only three clip levels are defined, separating product scores into three categories: (A) simple; (B) moderate/normal; and (C) complex. Thus, for example, a product may be evaluated on a point scale of 1-20 (scale selected by SRCS and included within RAU to be utilized for every product being analyzed). Each product's score is then normalized to within that scale based on the number of criteria utilized in the evaluation. If a characteristic is attributable to the product, then the characteristic is assigned a point within the GUI.

In order to determine when a product falls within A, B, or C category/classification, clip levels are assigned as the cut-off points, which define a set of pre-determined ranges for a particular product classification. Thus, in the illustrative embodiment of FIG. 5B, the scale is assigned 7 as a first clip level and 14 as a next clip level, where products rating/scoring between 1-7 are classified as "simple" products, products scoring between 8-14 are classified as "moderate" products, and products scoring above 14 classified as "complex" products. A list of characteristics, which may include some or all of the characteristics illustrated within the spreadsheet of FIGS. 6A-6B, is evaluated for the product. The invention contemplates an even more expansive list of criteria, and is therefore not limited to those illustrated by FIG. 5A or FIGS. 6A-6B.

In the illustrative embodiment, calculating the product classification involves inputting the numbers or scores and comparing the score against the clip levels to determine what category the product falls into, from among (1) simple; (2) moderate; and (3) complex projects. For standardization, all product scores are made to fit within the scale. The illustrative embodiment assumes the higher up the scale a product rates, the more resources will be required. Utilizing these criteria and a standardize set of clip levels for all products, different products may be compare against each other by simply calculating their score (normalized to the scale, if required) and comparing their relative rating within the standardize scale.

Figure 4B:
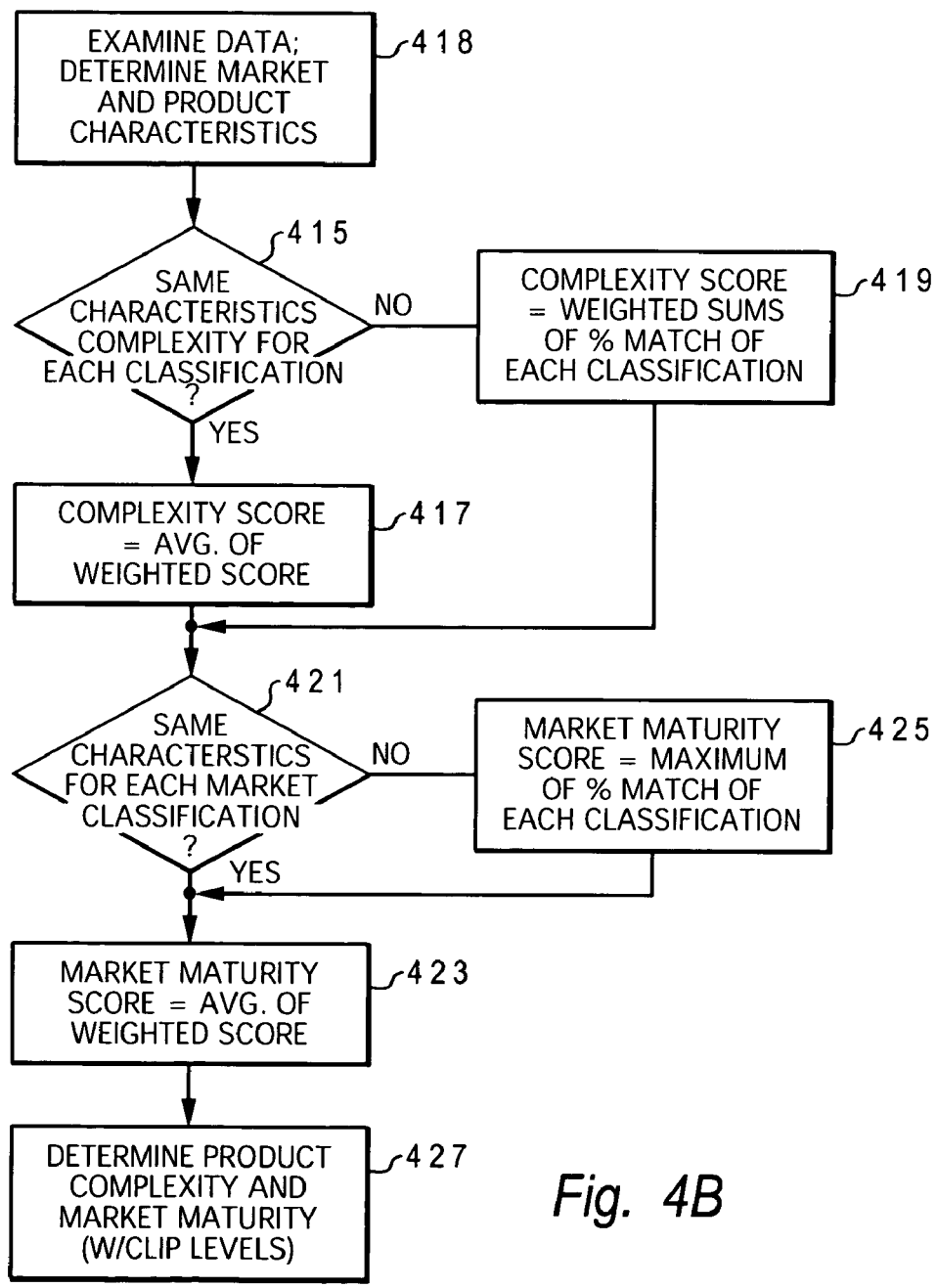
FIG. 4B is a flow chart of the process of calculating and determining market maturity and product complexity according to one embodiment of the invention.

With the clip levels determined at step 307 (of FIG. 3A), the complexity and/or market maturity classifications are assigned to the new product or new/upcoming releases, as shown at step 309. This assignment entails a number of steps illustrated by the flow chart of FIG. 4B. In FIG. 4B, the process begins at step 413 with an examination of the data available from the product and an analysis of the market to determine product and market characteristics.

As shown by GUIs 600 of FIGS. 6A and 6B, each characteristic 601 is assigned a true/false value 603 that indicates either true or false for a classification (similar to FIG. 5A). FIGS. 6A and 6B further indicate a weight factor assigned to each of the three GUIs associated with each product. Additionally, a complexity result (e.g., MAJOR) is displayed at the bottom of the third GUI based on the responses entered by the user for each characteristic.

Once the characteristics have been assigned numerical values, a check is made at step 415 whether the same characteristics are utilized for all classifications. When the same characteristics are used for all classifications, the product complexity score is calculated as simply the average of the weighted score, as shown at step 417. However, when different characteristics are used for different classifications this complexity score is determined at step 419 as the weighted sums of the percentage match of each classification, i.e., prodcpx=SUM (prodclaswght(i)*prodclasspct (i)).

As utilized herein, product complexity indicates how much support team manpower is (or will be) required. Also, complexity is determined by looking at other products, even products in another area, but compare with similar scores for complexity level and market maturity). A product may have a different rating based on different classifications having a set of different characteristics from another. For example, the product may evaluate as complex in the area of demonstrations (demos), but minor in the area of education.

As illustrated within the GUI 600, information utilized to determine the product complexity includes items such as: (1) the release number of the product; (2) the amount of change being made in the release; (3) the length of the development cycle; and (4) the number of different development and support organizations involved. In one implementation, existing databases and websites are referenced for this type of information.

Following (or concurrent with) the calculation of the product complexity in FIG. 4B, a determination is made at step 421 whether the same characteristics are used for each classification. As with product complexity, when the same characteristics are used for all classifications, the market maturity score is simply the average of the weighted score, as shown at step 425. However, when different characteristics are used for different classifications, the weighted score is calculated at step 421, as the maximum (or best fit) of the percentage match of each classification, i.e., mktmurty=MAX (mktmurtywght (i)*mktmurtypct (i)).

The information used to determine the market maturity includes items such as: (1) the revenue growth (decline) rate; (2) education classes in place on the product, or updates to existing classes, or number of new classes required; and (3) existence/number of product demos. Again, some of this information is currently available in various systems.

With these calculated values (i.e., product complexity score and market maturity score), the actual product complexity and market maturity are determined according to the defined clip levels (brackets) for each, as shown at step 427. Gathering the above information allows the system to calculate a classification for the project. The classification scheme is sufficiently straightforward so that classification may also be done on products that have been previously released. Also, by continually tracking and weighing resources that have been used by similarly classified projects, an ongoing allocation for what resources will be required for similar projects in progress is maintained.

Returning now to FIG. 3A, and step 311, historical cost information is gathered for existing products that are either similar to (or score similarly to) the new product. The historical cost information may be gathered for a wide range of existing products. For each of the previous products, the product complexity and market maturity are calculated similarly to the new product. Then, the historical cost for each type of support is determined at step 313. This historical cost is based on an average of the historical data for the various classifications. The calculation provides the typical historical costs associated with a complexity/market maturity classification.

Following, at step 315, the resource allocations for new products are computed based on complexity/maturity classification. To ensure the resource allocation is up-to-date, a time period is established during which the calculation is assumed to be fresh/valid. When the period expires, the calculated resource allocation is assumed to be stale (i.e., requires a new calculation). Thus, a determination is then made at step 317 whether the pre-established period has elapsed since the last computation of resource allocations for the new product. When the period has elapsed, the historical costs are re-assessed, and the allocations being utilized are updated at step 319. This involves periodically updating the averages for each classification to provide allocations based on information in the historical databases.

Thus, even after the product goes to market, an ongoing review is implemented to ensure the proper, continuing use and/or allocation of support resources. In one implementation, specific metrics are utilized to perform this ongoing review. For example, tracking the delay time between a problem submission and resolution indicates whether resources were in place to deal with the request. As a more specific example, tracking students (who take and/or attend a class) per education investment indicates whether demand is in line with expectations. Variances in these types of metrics from the norm trigger investigation and possible intervention (re-calculation).

Additionally, at step 321, the product and support volumes and costs are periodically examined to ensure the continued accuracy of allocations. A determination is made at step 323 whether the resource allocations are accurate and current, and when they are not, a re-calculation (or re-evaluation) of resource allocation is performed. The resource allocations are then utilized to plan support requirements for the upcoming and/or future product releases, as indicated at block 325. In planning for resource requirements for the next budget period, classifying projected products and use of historical resource usage numbers allows early calculation of expected budget requirements. Thus, following a determination at step 327 of support budget requirements during the product planning phase, historical costs and classification of projected products are utilized, at step 329, to build budget requirements for the next planning period.

Notably, while the invention is described from the perspective of a single product or single product release, the invention is applicable to a pre-lease analysis for multiple products during an upcoming release period. That is, the features of the invention may be applied to a fall plan type of budgeting in which the SRCS obtains a list of products/releases targeted for the next year, and after classifying these products and their product markets, build the expected next-year budget requirement for the entire product portfolio.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for automatically determining post-release resource allocation for a consumer product, the method comprising a computer system performing the functions of:
calculating product complexity of the consumer product utilizing a plurality of product characteristics, including release number of the product, amount of change being made in the release, length of development cycle, and number of different development and support organizations involved;
evaluating target market maturity of the consumer product utilizing a plurality of market characteristics, including revenue growth or decline rate, and at least one of: (a) educational classes in place, (b) a number of new classes, and (c) updates to existing classes required, and number of product demonstrations;
analyzing historical usage of similar products to the consumer product;
the computer system performing an automatic determination of a best allocation of post-release product support resources for the consumer product from a combination of the calculated product complexity, the target market maturity, the historical usage, and a consumer awareness of the post-release product support resources, wherein the best allocation of post-release product support resources correlates to a level of post-release product support resources utilized by consumers, and wherein the post-release product support resources include support for one or more of set-up, implementation, and maintenance of the consumer product;
providing the best allocation of post-release product support resources to the consumers;
wherein the calculating step further comprises:
identifying the product;
determining a list of characteristics for use in assessing classifications of the product complexity and market maturity, the determining further comprising: defining a weighting factor for each complexity classification; and determining data sources to be evaluated for each classification;
assigning a first value to each characteristic attributable to the product and a second value to each characteristic not attributable to the product; and
evaluating a relative rating of the product against a normalized rating chart based on a calculation involving at least one of the first value and the second value assigned to each characteristic, wherein evaluating the relative rating of the product based on the calculation further comprises:
determining whether each classification among multiple classifications for a product utilize a same set of characteristics;
in response to the same set of characteristics being utilized for each classification, calculating both a product complexity score and a market maturity score as an average of a weighted score; and
in response to different characteristics being used for different classifications, calculating the product complexity score as weighted sums of a percentage match of each classification, and calculating the market maturity score as a maximum of the percentage match of each classification.

2. The method of claim 1, performing the automatic determination further comprises:
importing data about the historical usage from a database of historical usage;
receiving a series of responses to questions about characteristics of the product and the target market;
evaluating the responses; and
determining the best allocation of post-release product support resources for the consumer product utilizing the evaluation of the responses and the historical usage data.

3. The method of claim 1 further comprising
outputting via an output device a result of the automatic determination, wherein the output represents a resource allocation that is implemented for the product when the product is released, the resource allocation including a number of personnel, an associated cost, and a level of marketing required for the product, and wherein the resource allocation is self-provisioned by a product developer within a development and go-to-market process for the product; and
wherein the post-release product support resources include one or more of:
support personnel;
computer systems; and
equipment required for interfacing with portions of the product.

4. The method of claim 1, further comprising:
receiving one or more updates to product characteristics and market maturity from an external source; and
in response to receiving updates to data associated with the product characteristics and the market maturity post-release of the product, initiating a re-analysis of the product for an updated resource allocation calculation, wherein the resource allocation is periodically updated based on real-time application of the product in a customer environment.

5. The method of claim 1, the identifying the product further comprising:
first assigning clip levels indicating a break in the normalized rating chart at which a product evaluates as having a specific classification among multiple classifications delineated by the clip levels.

6. The method of claim 1, wherein the performing an automatic determination further comprises:
in response to multiple products being developed for later release, providing the autonomic determination of best allocation of post-release product support resources for each of the multiple products based on relative metrics calculated for each of the multiple products given a total amount of support resources available for allocating to a combination of the multiple products, wherein the performing step enables early preparation of an expected next-year budget requirement for an entire product portfolio.

7. A system for automatically determining resource allocation for a consumer product, the system comprising:
a processor configured to:
algorithmically classify consumer products that requiring a support infrastructure based on a combination of determined product complexity and target market maturity for each of the consumer products by calculating product complexity of each of the consumer products utilizing a plurality of product characteristics, including release number of the consumer products, amount of change being made in the release, length of development cycle, and number of different development and support organizations involved;
determine support resource allocations based on the combined classification along with historical usage records for similarly classified products for each of the consumer products;

return the support resource allocations for each of the consumer products as one or more of a series of variables and associated values;
perform an automatic determination of a best allocation of post-release product support resources for the consumer product from a combination of a calculated product complexity, the target market maturity, a historical usage, and a consumer awareness of the post-release product support resources, wherein the best allocation of post-release product support resources correlates to a level of post-release product support resources utilized by consumers, and wherein the post-release product support resources include support for one or more of set-up, implementation, and maintenance of the consumer product; and
provide the best allocation of post-release product support resources to the consumers;
wherein the calculating product complexity further comprises:
identifying each of the consumer products including first assigning clip levels indicating a break in a normalized rating chart at which a product evaluates as having a specific classification among multiple classifications delineated by the clip levels;
determining a list of characteristics for use in assessing classifications of the product complexity and market maturity, the determining including: defining a weighting factor for each complexity classification; and determining data sources to be evaluated for each classification;
assigning a first value to each characteristic attributable to each of the consumer products and a second value to each characteristic not attributable to each of the consumer products; and
evaluating a relative rating of each of the consumer products against a normalized rating chart based on a calculation involving at least one of the first value and the second value assigned to each characteristic, wherein evaluating based on the calculation comprises:
determining whether each classification among multiple classifications for a product utilize a same set of characteristics;
in response to the same set of characteristics being utilized for each classification, calculating both a product complexity score and a market maturity score as an average of a weighted score; and
in response to different characteristics being used for different classifications, calculating the product complexity score as weighted sums of a percentage match of each classification, and calculating the market maturity score as a maximum of the percentage match of each classification.

8. The system of claim 7 wherein:
the algorithmically classify consumer products further comprises:
evaluating target market maturity of each of the consumer products utilizing a plurality of market characteristics, including revenue growth or decline rate, and, at least one of: (a) educational classes in place, (b) a number of new classes, and (c) updates to existing classes required, and number of product demonstrations;
the determine support resource allocations further comprises analyzing historical usage of similar products to each of the consumer products; and
the perform an automatic determination further comprises:
importing data about the historical usage from a database of historical usage; and
receiving a series of responses to questions about characteristics of the consumer products and the target market;
evaluating the responses; and
utilizing the evaluation of the responses and the historical usage data to determine the best allocation of post-release product support resources for the consumer product.

9. The system of claim 7, wherein the processor is further configured to:
output a result of the automatic determination, wherein the output represents a resource allocation that is implemented for the consumer products when the consumer products are released, the resource allocation including a number of personnel, an associated cost, and a level of marketing required for the consumer products, and wherein the resource allocation is self-provisioned by a product developer within a development and go-to-market process for the consumer products; and
wherein the post-release product support resources include one or more of:
support personnel;
computer systems; and
equipment required for interfacing with portions of the product.

10. The system of claim 7, wherein the processor is further configured to:
receive one or more updates to product characteristics and market maturity from an external source; and
in response to receiving updates to data associated with the product characteristics and the market maturity post-release of the consumer products, extend a re-analysis of the consumer products for an updated resource allocation calculation, wherein the resource allocation is periodically updated based on real-time application of the consumer products in a customer environment.

11. A computer program product comprising:
a computer readable storage medium; and
instructions on the computer readable storage medium that execute on a processor of a computer device to enable automatic determination of resource allocation for a consumer product, the instructions including instructions for:
algorithmically classifying consumer products that require a support infrastructure based on a combination of determined product complexity and target market maturity for each of the consumer products by calculating product complexity utilizing a plurality of product characteristics, including release number of the product, amount of change being made in the release, length of development cycle, and number of different development and support organizations involved; and
determining support resource allocations based on the combined classification along with historical usage records for similarly classified products for each of the consumer products;
returning the support resource allocations for each of the consumer products as one or more of a series of variables and associated values;
performing an automatic determination of a best allocation of post-release product support resources for the consumer product from a combination of a calculated product complexity, the target market maturity, the historical usage, and a consumer awareness of the post-release product support resources, wherein the best allocation of post-release product support resources correlates to a level of post-release product support resources utilized by consumers, and wherein the post-release product support resources include support for one or more of set-up, implementation, and maintenance of the consumer product; and providing a best allocation of post-release product support resources to consumers of each consumer product wherein the instructions for calculating further comprises instructions for:

first assigning clip levels indicating a break in the normalized rating chart at which a product evaluates as having a specific classification among multiple classifications delineated by the clip levels;

identifying the product;

determining a list of characteristics for use in assessing classifications of the product complexity and market maturity;

defining a weighting factor for each complexity classification;

determining data sources to be evaluated for each classification;

assigning a first value to each characteristic attributable to the product and a second value to each characteristic not attributable to the product; and evaluating a relative rating of the product against a normalized rating chart based on a calculation involving at least one of the first value and the second value assigned to each characteristic, wherein the instructions for evaluating based on the calculation further comprises instructions for:

determining whether each classification among multiple classifications for a product utilize a same set of characteristics;

in response to the same set of characteristics being utilized for each classification, calculating both a product complexity score and a market maturity score as an average of a weighted score; and in response to different characteristics being used for different classifications, calculating the product complexity score as weighted sums of a percentage match of each classification, and calculating the market maturity score as a maximum of the percentage match of each classification.

12. The computer program product of claim 11, further comprising instructions for:

providing a graphical user interface (GUI) that includes a display of product characteristics for each classification;

receiving, via the GUI, user responses to each of the product characteristics;

calculating the product complexity and market maturity from the user responses; and outputting on an output device a result of the automatic determination, wherein the output represents a resource allocation that is implemented for each of the consumer products when each of the consumer products is released, the resource allocation including a number of personnel, an associated cost, and a level of marketing required for each of the consumer products, and wherein the resource allocation is self-provisioned by a product developer within a development and go-to-market process for each of the consumer products; and in response to multiple products being developed for later release, providing the automatic determination of best allocation of post-release product support resources for each of the multiple products based on relative metrics calculated for each of the multiple products given a total amount of support resources available for allocating to a combination of the multiple products, wherein the performing—enables early preparation of an expected next-year budget requirement for an entire product portfolio;

wherein the post-release product support resources include one or more of: support personnel; computer systems; and equipment required for interfacing with portions of the product.

13. The computer program product of claim 11 wherein:

the instructions for algorithmically classifying consumer products further comprises instructions for:

evaluating target market maturity utilizing a plurality of market characteristics, including revenue growth or decline rate, educational classes in place or number of new classes or updates to existing classes required, and number of product demonstrations; and the instructions for determining support resource allocations comprises instructions for analyzing historical usage of similar products.

14. The computer program product of claim 13, wherein the instructions for automatic determination further comprises instructions for:

importing data about the historical usage from a database of historical usage;

receiving a series of responses to questions about characteristics of each of the consumer products and the target market;

evaluating the responses;

utilizing the evaluation of the responses and the historical usage data to determine the best allocation of post-release product support resources for the consumer products;

receiving one or more updates to product characteristics and market maturity from an external source; and in response to receiving updates to data associated with the product characteristics and the market maturity post-release of the consumer products, initiating a re-analysis of the consumer products for an updated resource allocation calculation, wherein the resource allocation is periodically updated based on real-time application of the consumer products in a customer environment.

* * * * *